J. D. MAYHEW.
REFRIGERATING APPARATUS.
APPLICATION FILED APR. 21, 1908.
906,906.
Patented Dec. 15, 1908.
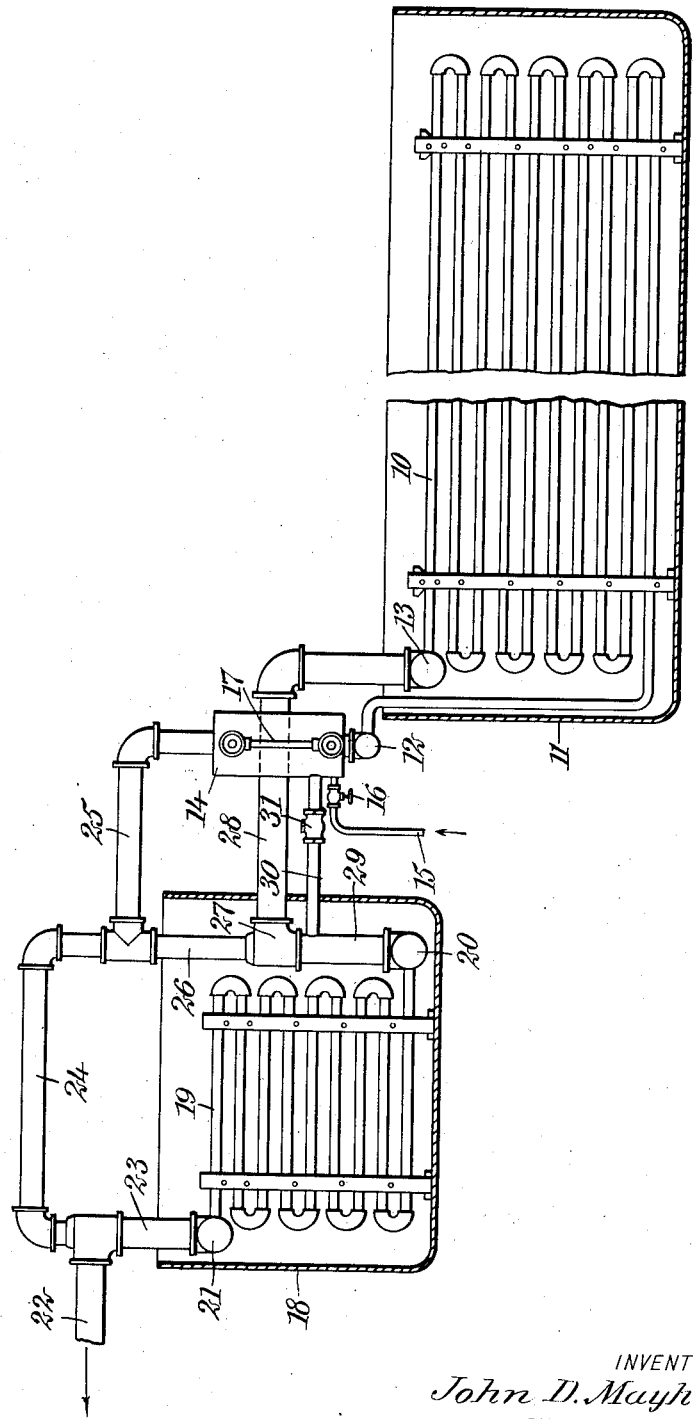
WITNESSES
INVENTOR
John D. Mayhew
BY

UNITED STATES PATENT OFFICE.

JOHN DAUGHERTY MAYHEW, OF TYLER, TEXAS, ASSIGNOR OF ONE-SIXTH TO JOHN LOCKE BOOTY, OF TYLER, TEXAS, ONE-SIXTH TO CALEB W. DAWLEY, OF McALESTER, OKLAHOMA, AND ONE-SIXTH TO PAUL GOODWIN WHALEY AND ONE-SIXTH TO WILLIAM LITTLEJOHN MARTIN, BOTH OF MARSHALL, TEXAS.

REFRIGERATING APPARATUS.

No. 906,906.　　　　Specification of Letters Patent.　　　Patented Dec. 15, 1908.

Application filed April 21, 1908. Serial No. 428,393.

*To all whom it may concern:*

Be it known that I, JOHN D. MAYHEW, a citizen of the United States, and a resident of Tyler, in the county of Smith and State of Texas, have invented a new and Improved Refrigerating Apparatus, of which the following is a full, clear, and exact description.

This invention relates to certain improvements in refrigerating apparatus, and more particularly to a system for handling and regulating the ammonia or other liquefied refrigerant agent, so as to maintain the expansion coils substantially filled with the refrigerant agent and to prevent the return of any of the refrigerant agent in a liquid form to the compressor.

In connection with the main expansion coils, there is employed a coil for preliminarily cooling the water to be frozen, and this coil is so connected to the rest of the system that the liquid and gas from the expansion coils are separated and only the liquid delivered to the preliminary cooling coil. I also so construct the system that should the preliminary cooling coil become partially filled with a liquid refrigerant agent, the liquid may be returned to the main expansion coil, all parts of which are under substantially the suction pressure from the compressor.

Reference is to be had to the accompanying drawing, forming a part of this specification, in which the figure shows diagrammatically an arrangement of coils, conduits and valves for carrying out my invention.

In my improved system, I provide a plurality of expansion coils, only one of which, 10, is illustrated in the accompanying drawings. The coils are arranged in a suitable tank 11, adapted for the reception of brine, and the cans or other containers for the water or other liquid substance to be frozen. The inlet end of each expansion coil is connected to a header 12, and the exhaust end of each coil is connected to a header 13. Disposed above the tank 11 and connected to the header 12, is an expansion chamber or cylinder 14, adapted to receive the liquefied refrigerant agent hereinafter referred to as "ammonia", through a high pressure supply conduit 15 and an expansion valve 16. The liquid ammonia enters the chamber 14 and flows from therethrough the header 12 into the expansion coils. The expansion valve is so controlled as to maintain the chamber 14 partially filled with liquid ammonia and to maintain the expansion coils completely filled. The height of the liquid in the expansion chamber 14 may be readily observed through a suitable gage glass 17. Adjacent the tank 11 I provide a second and somewhat smaller tank 18, adapted to contain the distilled water and preliminarily cool the same before it is delivered to the cans in the main freezing tank 11. Within said tank 18, are one or more preliminary cooling coils 19 for the ammonia, one end of said coil or coils being connected to a supply header 20 and the opposite end or ends being connected to an exhaust header 21.

The compressor is connected to a suction or return conduit 22, and this conduit is provided with a plurality of branches, whereby it draws gas from the exhaust header 21 of the preliminary cooling coil, from the exhaust header 13 of the main expansion or freezing coil, and from the expansion chamber 14. These several branches may, if desired, be independent of each other, but, as illustrated, the suction conduit 22 is connected to two branches 23 and 24, the former of which connects to the header 21 and the latter of which has one branch 25 leading to the chamber 14, and a second branch 26 leading to a T-coupling 27. From the T, one branch 28 leads to the header 13 and a second branch 29 leads to the supply leader 20 of the preliminary cooling coil. The expansion chamber 14 is connected to the branch 29 by a conduit 30, having a regulating valve 31, said conduit being disposed at a lower level than the branch 28 and at a higher level than the high pressure supply conduit 15 and the header 12.

In the operation of my improved system, liquid ammonia is supplied under high pressure through the conduit 15 and expansion valve 16 to the chamber 14, from which it flows to the expansion coils 10 to fill the latter. The entire internal surface of the expansion coils is exposed to the liquid ammonia, while the entire outside surface is exposed to the brine or other fluid to be cooled. The maximum benefit of the vaporization of the ammonia is thus attained and the brine is cooled quickly and to a very low temperature. The ammonia gas leaving the expansion coils passes from the header 13 through the branch conduits 28, 26 and 24 to the suction conduit 22, and thence to the compressor. In case any of the liquid in the expansion coils is carried along by the gas, or in case any of the liquid in the coils vaporizes to form a gas piston and force part of the liquid out of the coils, all such liquid will automatically separate from the gas at the T-coupling 27, and the liquid will flow by gravity to the header 20 and the gas flow to the suction conduit. The liquid flowing to the header 20 partially fills the preliminary cooling coil 19, and the gas leaves the latter through the header 21 and branch 23 to the suction conduit 22. Thus all liquid is prevented from returning to the compressor and the gas is returned in a dry superheated state. The ammonia is cooled by its own vaporization in the chamber 14, so that at the time it enters the expansion coils, it is at a very low temperature. Any gas which may form from vaporization of liquid in the chamber 14 will pass directly to the compressor through the conduits 25, 24 and 22. This vaporization cools the remaining liquid to a very low temperature prior to the entrance of the latter into the main vaporizing coils.

Should such a large quantity of liquid be carried from the expansion coils to the preliminary cooling coil, as to raise the level in the latter dangerously near to the branch 28, the valve 31 may be opened and the liquid in the coil 19 permitted to flow into the chamber 14 and thence again to the expansion coils.

Having thus described my invention, I claim as new and desire to secure by Letters Patent:

1. In a refrigerating apparatus, the combination of a main freezing coil, means for delivering a volatile refrigerant agent thereto, a preliminary cooling coil for the material to be frozen, a suction pipe, an exhaust conduit, and connections whereby gas from said freezing coil may pass directly to said suction conduit and liquid from said freezing coil may pass to said preliminary cooling coil and thence to said suction pipe.

2. In a refrigerating apparatus, the combination of an expansion coil, means for delivering thereto a volatile refrigerating agent, a suction conduit for the exhaust gas from said coil, and connections between said conduit and said coil, said connections including a direct passage and a second expansion coil in parallel with said direct passage.

3. In a refrigerating apparatus, the combination of a main freezing coil, means for maintaining said coil filled with a liquefied refrigerant agent at low or suction pressure, a preliminary cooling coil, a suction conduit, means for delivering the non-volatilized liquid from said freezing coil to said preliminary cooling coil, means for delivering the gas from said freezing coil direct to said suction conduit, and means for returning an excess of liquid from said preliminary cooling coil to said freezing coil.

4. In a refrigerating apparatus, the combination of an expansion coil, a chamber in open communication therewith and at a higher elevation, means for delivering a volatile refrigerant agent to said chamber, an exhaust conduit from said coil, a second expansion coil communicating with said exhaust conduit and adapted to receive a non-volatilized liquid therefrom, and means for returning non-volatilized liquid from said second coil to said chamber.

In testimony whereof I have signed my name to this specification in the presence of two subscribing witnesses.

JOHN DAUGHERTY MAYHEW.

Witnesses:
 JOE D. PATTERSON,
 RUDOLPH BREFELD.